(12) United States Patent
Iwano (10) Patent No.: US 7,266,068 B2
(45) Date of Patent: Sep. 4, 2007

(54) OPTICAL DISK APPARATUS AND METHOD OF CONTROLLING THE OPTICAL DISK APPARATUS

(75) Inventor: Osamu Iwano, Akishimia (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 589 days.

(21) Appl. No.: 10/940,957

(22) Filed: Sep. 15, 2004

(65) Prior Publication Data
US 2005/0117488 A1   Jun. 2, 2005

(30) Foreign Application Priority Data
Nov. 28, 2003   (JP) .............................. 2003-400906

(51) Int. Cl.
*G11B 7/00* (2006.01)
*G11B 27/36* (2006.01)
(52) U.S. Cl. ............................... 369/53.26; 369/53.27; 369/59.11
(58) Field of Classification Search ..................... None
See application file for complete search history.

(56) References Cited

U.S. PATENT DOCUMENTS 4,845,720 A * 7/1989 Koishi et al. .................. 372/31
6,359,847 B1   3/2002 Shimizu
6,661,757 B2 * 12/2003 Chuang ................... 369/53.26
2002/0041552 A1   4/2002 Shiozaki et al.
2004/0184378 A1 * 9/2004 Kwon et al. .............. 369/53.26
2005/0025018 A1 * 2/2005 Hsu et al. ................. 369/53.26

FOREIGN PATENT DOCUMENTS

| JP | 2000-215451 | 8/2000 |
| JP | 2002-109733 | 4/2002 |
| JP | 2002-334440 | 11/2002 |

* cited by examiner

*Primary Examiner*—William Korzuch
*Assistant Examiner*—Christopher R Lamb
(74) *Attorney, Agent, or Firm*—Pillsbury Winthrop Shaw Pittman, LLP (57) ABSTRACT

A light emitting unit is caused to emit a laser beam having a pulse width T1 broader than a pulse width T2 used at a time of recording, and a light receiving unit is caused to receive the laser beam and to output a first detection signal. A first control signal V1 is generated by comparing a value held at a peak level of the first detection signal with a target value of a quantity of the laser beam, and a second control signal V2 is generated by comparing the first control detection signal with the target value of a quantity of the laser beam.

9 Claims, 7 Drawing Sheets

OPTICAL DISK APPARATUS AND METHOD OF CONTROLLING THE OPTICAL DISK APPARATUS

CROSS-REFERENCE TO RELATED APPLICATIONS

This application is based upon and claims the benefit of priority from prior Japanese Patent Application No. 2003-400906, filed Nov. 28, 2003, the entire contents of which are incorporated herein by reference.

BACKGROUND OF THE INVENTION

1. Field of the Invention

The present invention relates to an automatic power control circuit for a laser beam of an optical disk apparatus, and in particular, to an optical disk apparatus having an automatic power control circuit for a laser beam in accordance with ringing or waveform rounding, and a method of controlling the optical disk apparatus.

2. Description of the Related Art

In an optical disk apparatus, a method of controlling the intensity of a laser outgoing beam involves the detection of an outgoing laser beam, and control thereof by an APC circuit in which a front monitor signal proportional to a quantity of the detected laser beam is made to be an input. Because the outgoing beam varies at a high speed during the time of recording data, the outgoing beam is sampled-and-held by sampling pulses in the APC circuit, and the APC circuit is made to actuate at respective levels of the recording level/erasing level/reproducing (bottom) level. Further, in the case of rewritable type media such as CD-RWs, DVD-RWs, and the like, because a laser outgoing beam varies between multi-pulses at a high speed when multi-pulses are used, samplings are not sufficient for the situation. Therefore, control of an outgoing beam is stably carried out by using a bottom hold circuit.

However, the signal quality of a front monitor signal inputted to the APC circuit is easily affected in the above-described control method. In particular, there arises an error between a desired outgoing laser beam and a controlled outgoing laser beam due to a factor such as ringing, waveform rounding, or the like. In contrast thereto, a related technique corresponding to waveform rounding in a monitor signal has been known.

In the Patent Document (Jpn. Pat. Appln. KOKAI Publication No. 2002-109733) which is a prior art, there is disclosed a recording/reproducing apparatus for an optical disk apparatus which controls a read level at the time of a light mode. Here, a quantity of shift of a monitor signal is detected while carrying out recording, and a read level at the time of a light mode is optimized.

However, in the prior art of Patent Document 1, because detection of a quantity of shift of a monitor signal is carried out simultaneously with usual processing being carried out, processing in which a pulse width of a laser beam is adjusted in order to detect the quantity of shift, or the like is not carried out. Accordingly, there is the problem that detection of a quantity of shift of a monitor signal cannot be carried out in the optimum state. Further, in the prior art of Patent Document 1, detection of a quantity of shift of a monitor signal for optimizing a light level of a laser beam at the time of a light mode is not carried out, but detection of a quantity of shift for optimizing a read level is carried out. Accordingly, there is the problem that harmful effect of ringing or waveform rounding for a writing level at the time of light mode cannot be solved.

BRIEF SUMMARY OF THE INVENTION

An embodiment of the present invention is a method of controlling an optical disk apparatus, comprising: causing a light emitting unit to emit a laser beam having a pulse width broader than a pulse width used at the time of recording; causing a light receiving unit to receive the laser beam and to output a first detection signal; generating a first control signal by comparing a value held at a peak level of the first detection signal with a target value of a quantity of a laser beam; generating a second control signal by comparing the first detection signal with the target value of a quantity of the laser beam; determining a correction amount for equalizing the first control signal and the second control signal when the first control signal and the second control signal are not equal to each other, and storing the correction amount; and when information is recorded on an optical disk, controlling a quantity of light of the laser beam by correcting a control signal generated in accordance with the detection signal from the light receiving unit by means of the correction amount, and supplying the corrected control signal to a driving unit of the light emitting unit.

DETAILED DESCRIPTION OF THE INVENTION

Hereinafter, an embodiment of the present invention will be described in detail with reference to the drawings.

<Optical Disk Apparatus According to the Present Invention>

(Configuration)

Figure 1:
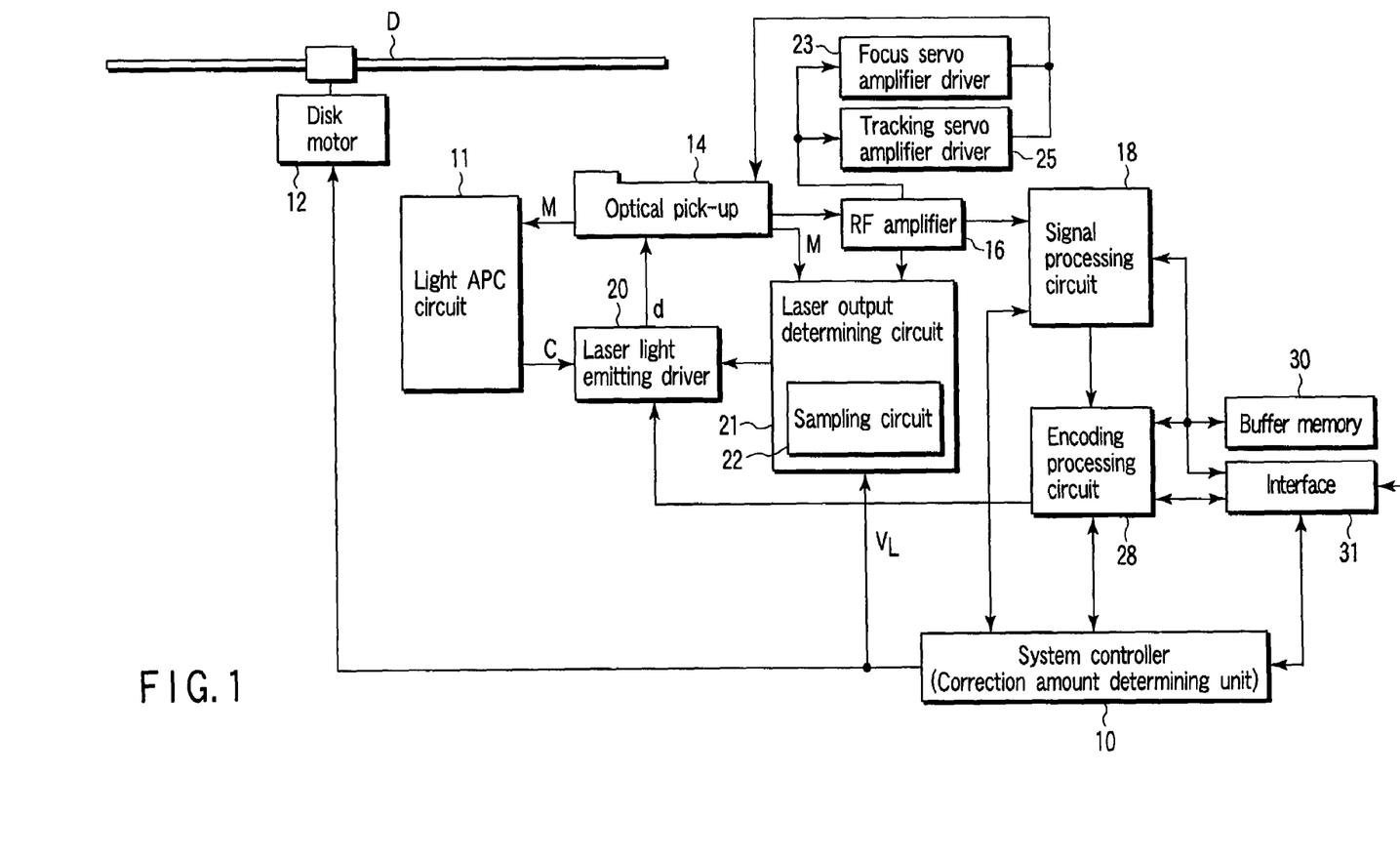
FIG. 1 is a block diagram showing one example of a configuration of an optical disk apparatus according to the present invention.

In FIG. 1, the optical disk apparatus according to the invention has an optical disk motor 12 which holds an optical disk D and rotates the optical disk D at a predetermined speed of rotation, an optical pick-up 14 which irradiates a light beam on the optical disk D and detects the reflected light, an RF amplifier 16 to which a detected signal is supplied and which generates an RF signal and a servo signal, and a signal processing circuit 18 and a laser output determining circuit 21 to which RF signals are supplied. Further, there are provided an interface 31 for transmitting and receiving data to and from the exterior, and a buffer memory 30 in which data provided by being connected to the interface 31 and regenerative data read by the optical pick-up 14, or the like are temporarily stored.

Further, there are provided an encoding processing circuit 28 which is connected to the buffer memory 30 and the interface 31, and which encodes the provided data, and a laser light emitting driver 20 to which the output encoded by the encoding processing circuit 28 is supplied. The laser light emitting driver 20 is caused to control the output thereof by a control signal from the laser output determining circuit 21 connected to a system controller 10 for controlling the entire system operation, and causes the optical pick-up 14 to generate a laser beam based on an RF signal supplied from the RF amplifier 16. Note that the system controller 10 is connected to the respective portions described above via data buses, and controls the operations thereof. Further, the system controller 10 includes a correction amount determining unit for carrying out processing of detecting an error amount corresponding to ringing and waveform rounding and processing of determining a correction signal corresponding to the error amount which are for corrective processing by a light APC circuit 11 which will be described later and the feature of the present invention.

Furthermore, there are respectively provided a focus servo amplifier driver 23 which receives a focus error signal serving as a servo signal generated at the RF amplifier 16, and carries out focus control of the optical pick-up 14, and further, a tracking servo amplifier driver 25 which receives a tracking error signal serving as a servo signal generated at the RF amplifier 16, and carries out tracking control of the optical pick-up 14.

Figure 2:
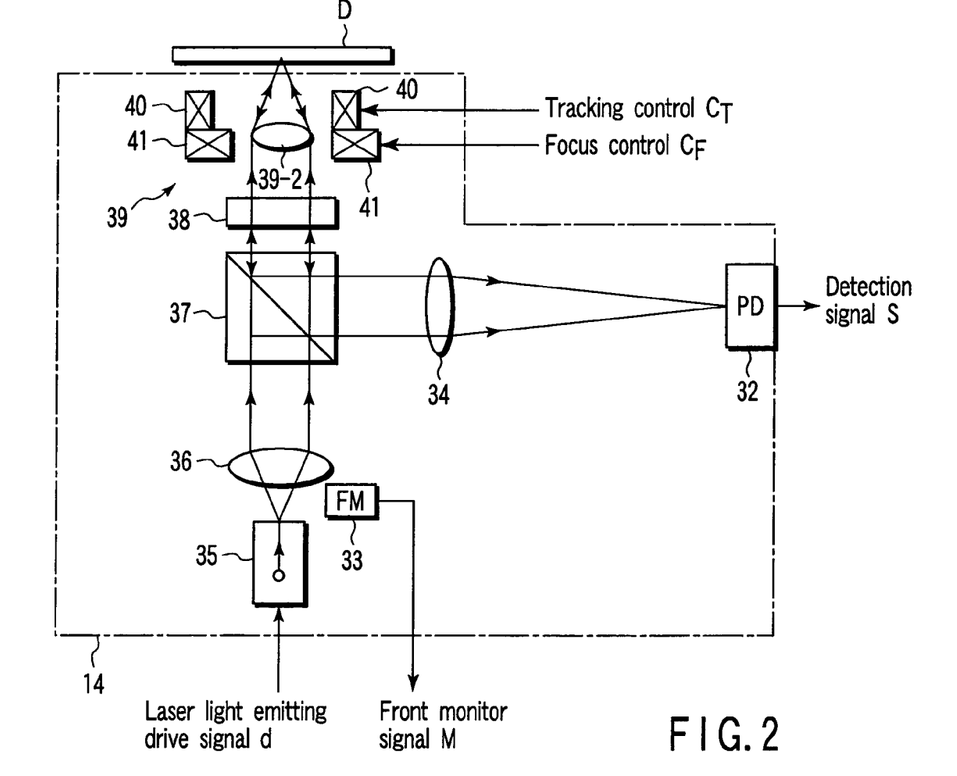
FIG. 2 is a block diagram showing a configuration of one example of a pick-up of the optical disk apparatus according to the invention.

Moreover, as shown in FIG. 2, the optical pick-up 14 of the optical disk apparatus according to the invention has an actuator 39 for holding an objective lens 39-2, and driving coils 40 in a tracking direction of the actuator and driving coils 41 in a focusing direction of the actuator are provided at the actuator 39. Here, servo control is made possible by supplying a tracking control signal CT and a focus control signal CF respectively from the tracking driver 25 and the focus driver 23 described above.

The optical pick-up 14 carries out both of irradiation and light-receiving due to actuation of a beam splitter 37 or the like. Irradiation of a laser beam from a photo diode 35 corresponding to a laser light emitting drive signal d of the laser light emitting driver 20 passes through the beam splitter 37 via a lens 36, and is condensed and irradiated on a predetermined region of the optical disk D via a ¼ wavelength plate 38 or the like by the objective lens 39-2. Moreover, the reflected light from the optical disk D is enlarged by the objective lens 39-2, is split toward a condensing lens 34 side by the beam splitter 37, and is further supplied to a photo detector 32. The photo detector 32 supplies a detection signal S, and a tracking error signal and a focus error signal are supplied to the tracking servo amplifier 25 and the focus servo amplifier 23 via the RF amplifier 16. Further, a detection signal S for generating a regenerative signal is supplied to the signal processing circuit 18.

In addition, the optical disk apparatus according to the present invention has the light APC (Automatic power controller) circuit 11 which carries out control of the laser light emitting driver 20 by receiving a front monitor signal M from a front monitor 33 of the optical pick-up 14, and by supplying a control signal C which appropriately corresponds to the signal to the laser light emitting driver 20. The light APC circuit 11 particularly carries out power control of a laser beam at the time of writing on the optical disk D.

Figure 3:
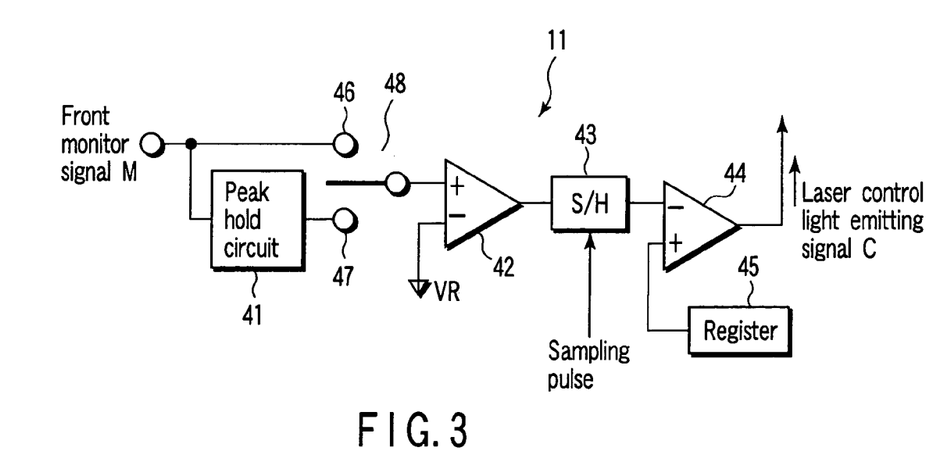
FIG. 3 is a block diagram showing one example of a configuration of a light APC circuit of the optical disk apparatus according to the invention.

Here, as shown in FIG. 3, the light APC circuit 11 has a peak hold circuit 49 for receiving a front monitor signal M from the front monitor 33 of the optical pick-up 14, a switch part 48 which can arbitrarily select one of an input terminal 46 receiving a front monitor signal M and an input terminal 47 from the peak hold circuit 49, a gain amplifier 42 to which an output of the switch part 48 and a reference electric potential are inputted, a sampling hold circuit 43 to which the gain amplifier 42 is supplied, and a gain amplifier 44 to which an output of the sampling hold circuit 43 and a register 45 in which a correction amount is stored are supplied.

(Basic Operation)

In the optical disk apparatus having such a configuration, processing of regenerating an optical disk is carried out as follows. Namely, under the control of the system controller 10, the optical disk D rotated at a predetermined speed by the optical disk motor 12 emits a laser beam in accordance with the laser light emitting driver 20 set at the laser output setting circuit 21, the reflected light thereof is detected by the optical pick-up 14, and a detection signal based on the detection is output. The detection signal is supplied to the RF amplifier 16, an RF signal output therefrom is supplied to the signal processing circuit 18 and the laser output setting circuit 21, and a focus error signal and a tracking error signal serving as servo signals generated at the RF amplifier 16 are respectively supplied to the focus servo amplifier 23 and the tracking servo amplifier 25. At the signal processing circuit 18, the RF signal is decoded, and the decoded signal is temporarily stored in the buffer memory 30, or is directly output to the exterior via the interface 31. Further, the system controller 10 controls rotation of the optical disk motor 12 by generating a control signal for controlling the rotation of the optical disk motor 12.

Moreover, in the optical disk apparatus having such a configuration, processing of recording onto an optical disk is carried out as follows. Namely, under the control of the system controller 10, for example, the data supplied via the interface 31 is supplied to the encoding processing circuit 28 after being temporarily stored in the buffer memory 30, and is encoded and output. In accordance with the encoded output and an output from the laser output setting circuit 21, a driver output of the laser light emitting driver 20 is supplied to the optical pick-up 14. In the optical pick-up 14, recording processing is carried out by emitting a laser beam corresponding to the driver output from the mounted photo diode 35, and by irradiating the laser beam on the storage region of the optical disk D which has been being rotated at a predetermined speed of rotation by the optical disk motor 12.

<Light APC Circuit According to the Present Invention>

Figure 4:
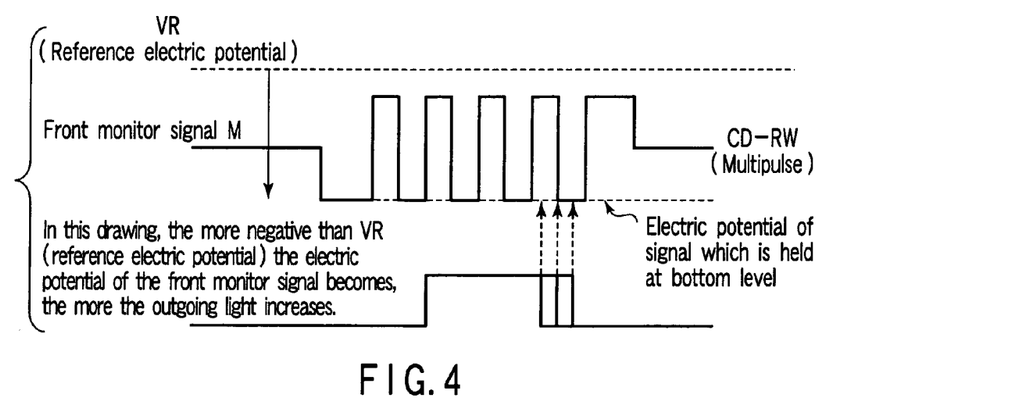
FIG. 4 is a graph showing one example of an ideal front monitor signal in the APC circuit of the optical disk apparatus according to the invention.
Figure 5:
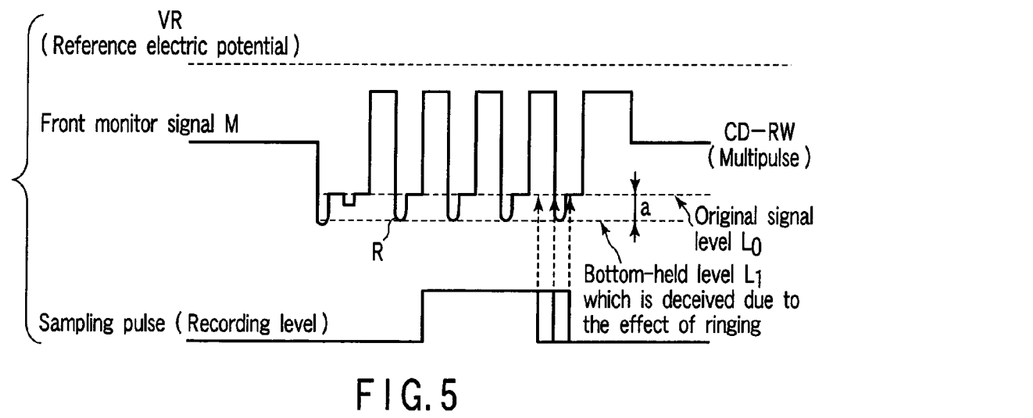
FIG. 5 is a graph showing one example of a front monitor signal in which ringing has arisen in the APC circuit of the optical disk apparatus according to the invention.
Figure 6:
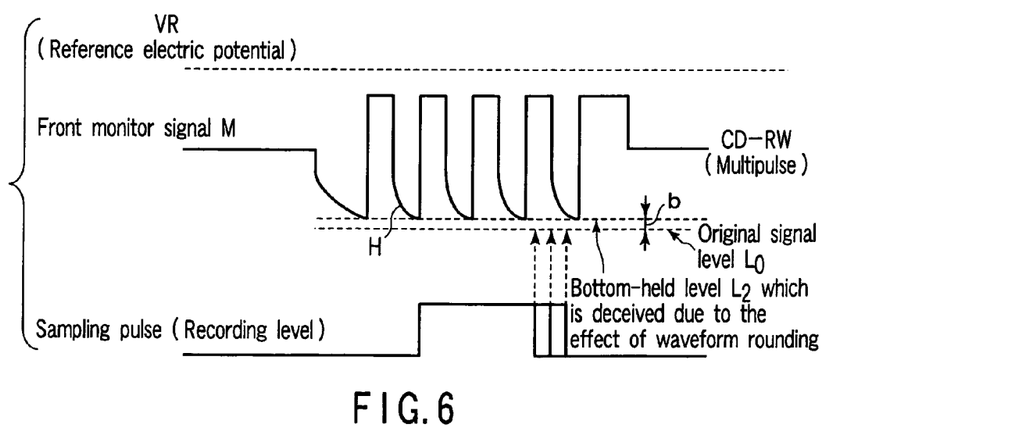
FIG. 6 is a graph showing one example of a front monitor signal in which signal rounding has arisen in the APC circuit of the optical disk apparatus according to the invention.
Figure 7:
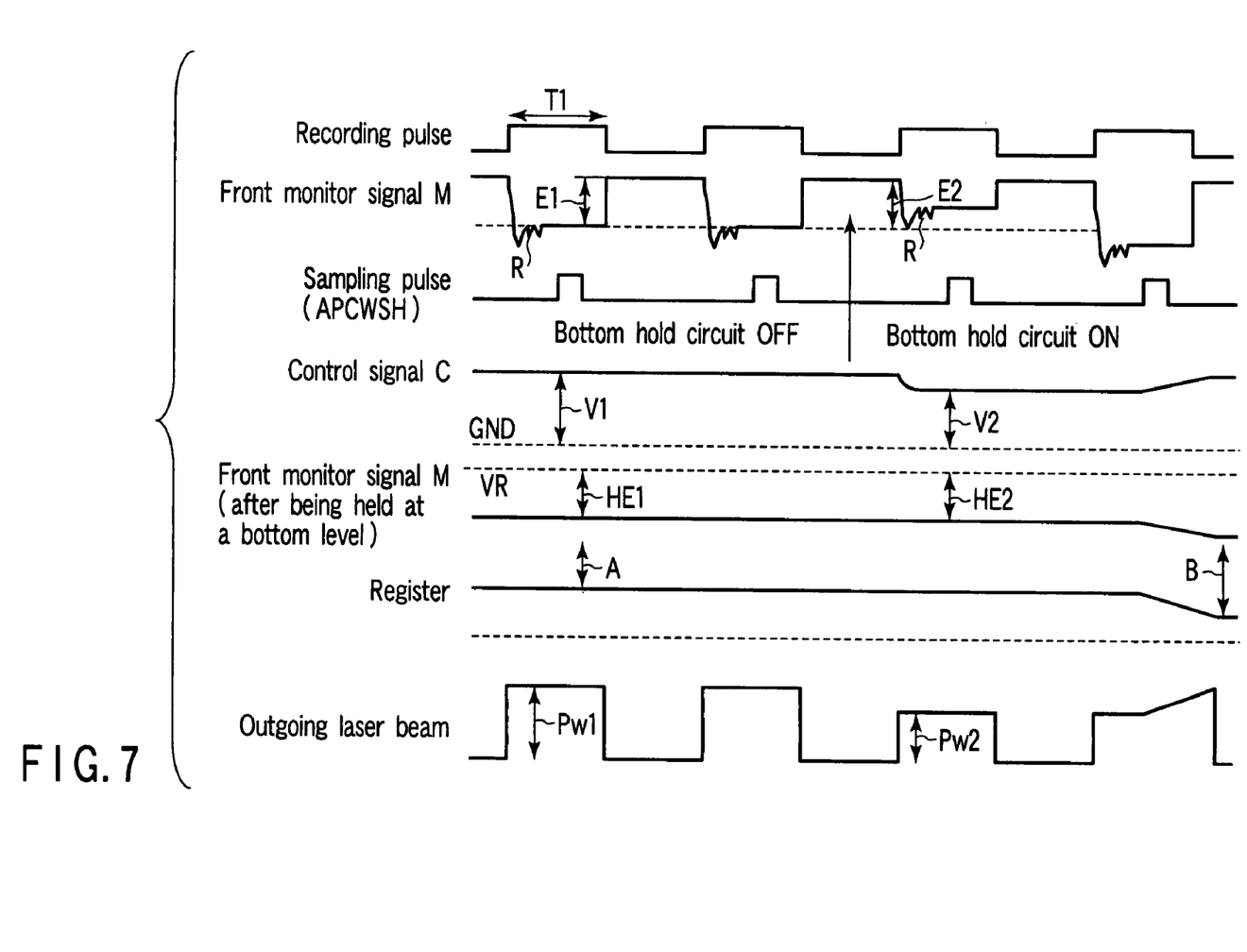
FIG. 7 is a graph showing one example of a case where ringing has been solved by a pulse having a long pulse width in the optical disk apparatus according to the invention.
Figure 8:
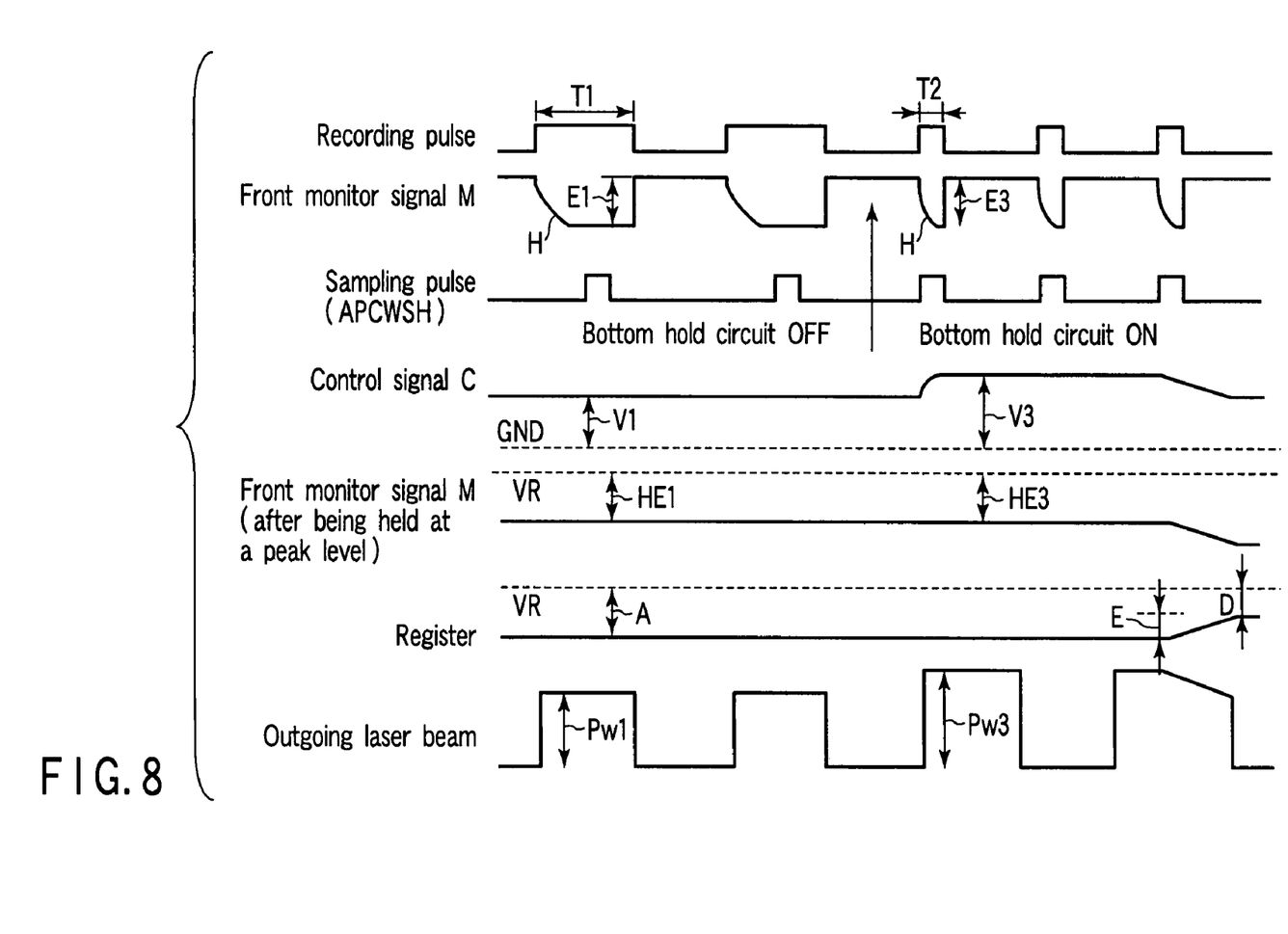
FIG. 8 is a graph showing one example of a case where signal rounding has been solved by a pulse having a long pulse width in the optical disk apparatus according to the invention.
Figure 9:
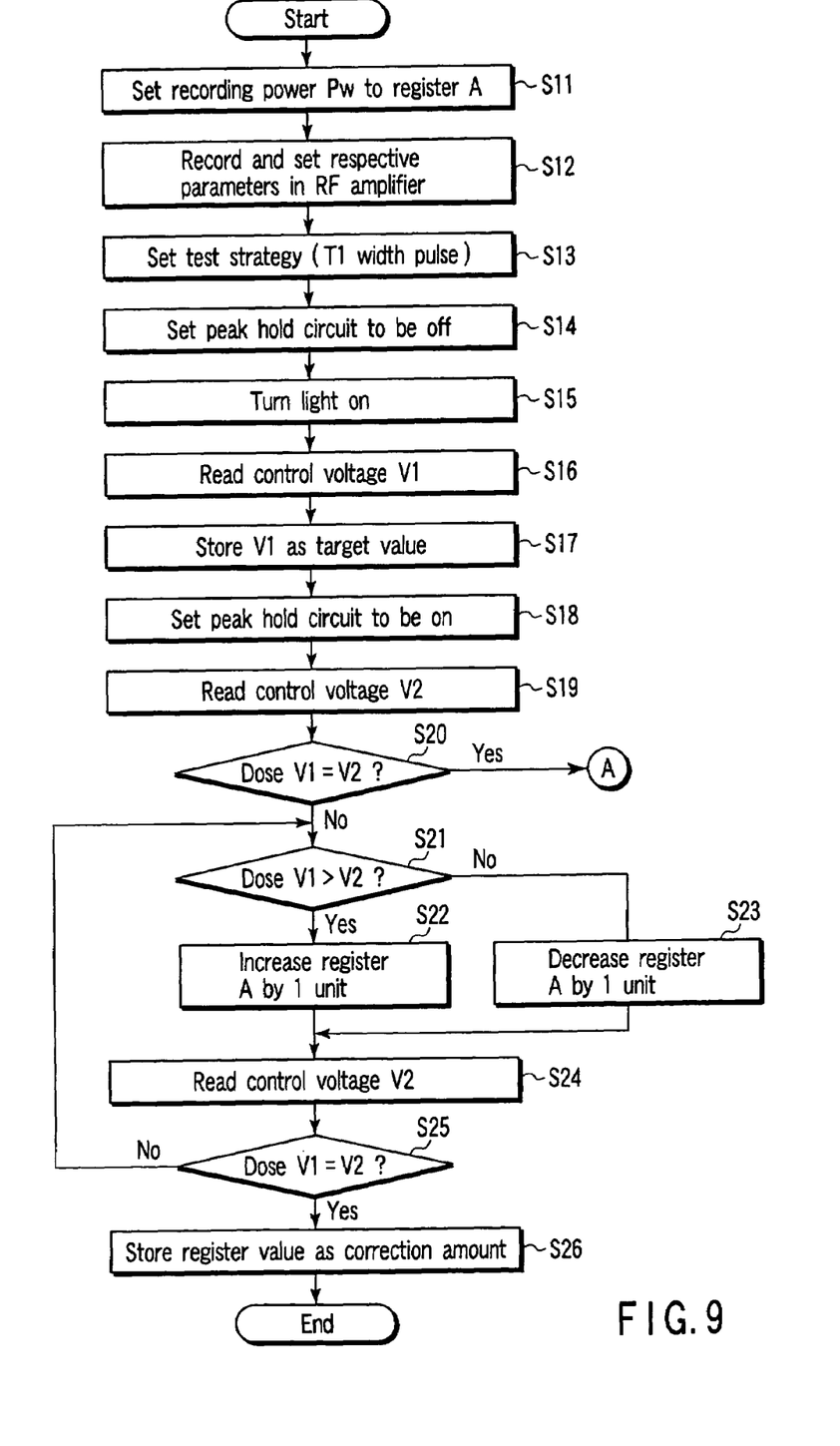
FIG. 9 is a flowchart showing one example of processing of generating a correction amount with respect to ringing, in the APC circuit of the optical disk apparatus according to the invention.

Hereinafter, operations of the light APC circuit according to the invention will be described in detail with reference to the drawings. FIG. 4 is a graph showing one example of an ideal front monitor signal in the APC circuit of the optical disk apparatus according to the invention. FIG. 5 is a graph showing one example of a front monitor signal in which ringing has arisen in the APC circuit of the optical disk apparatus according to the invention. FIG. 6 is a graph showing one example of a front monitor signal in which signal rounding has arisen in the APC circuit of the optical disk apparatus according to the invention. FIG. 7 is a graph showing one example of a case where ringing has been solved by a pulse having a long pulse width in the optical disk apparatus according to the invention. FIG. 8 is a graph showing one example of a case where signal rounding has been solved by a pulse having a long pulse width in the optical disk apparatus according to the invention. FIG. 9 is a flowchart showing one example of processings of determining/storing a correction amount, in the APC circuit of the optical disk apparatus according to the invention.

(Basis Operation)

In the optical disk apparatus described above, basic operation of the light APC (Automatic power control) circuit 11 according to the invention will be described. In FIGS. 1 to 3, control of a light power serving as a laser beam at the time of recording processing is carried out, the detection signal M from the front monitor 33 is supplied to the peak hold circuit 49 and the input terminal 46, and the output of the peak hold circuit 49 is supplied to the input terminal 47. However, at the time of usual data recording, the detection signal M from the front monitor 33 is supplied from the input terminal 46 to the input terminal of the gain amplifier 42, and a control signal which is appropriate as compared with a reference electric potential VR shown in FIG. 4 is output from the gain amplifier 42. The control signal is further supplied to the input terminal of the gain amplifier 44 via the sampling hold circuit 43, and when a correction value is not supplied from the register 45, the control signal is directly supplied to the laser light emitting driver 20 as a laser control current C. The laser light emitting driver 20 controls a quantity of light of the laser beam from the photo diode 35 serving as a light emitting unit by supplying a laser light emitting drive signal d to the photo diode 35 in order to appropriately control a quantity of light of the laser beam in accordance with the laser control current C.

(Malfunction due to Ringing and Waveform Rounding)

However, in the detection signal from the front monitor 33 of the optical pick-up 14, there are cases in which ringing R shown in FIG. 5 or waveform rounding H shown in FIG. 6 arises, and an error component caused therefrom deteriorates the signal quality of the detection signal.

Namely, in FIG. 5, the front monitor signal M shows a level $L_1$ including an error amount a due to ringing R, in place of showing an original level $L_0$. Here, the ringing is a noise generated in a short time, and in accordance therewith, not the original level $L_0$, but the larger level $L_1$ to which the error amount a is added is shown, which affects controlling a quantity of laser beam.

Further, in FIG. 6, the front monitor signal M shows a level $L_2$ including an error amount b due to waveform rounding H, in place of showing an original level $L_0$. The waveform rounding H shows an error value due to a pulse period being completed before the signal sufficiently reaches an original value because of an insufficient pulse width, and the original level $L_0$ of the front monitor signal M is not shown, but the insufficient level $L_2$ to which an error amount b is added is shown, which affects controlling a quantity of laser beam in the same way.

It is said that such ringing R and waveform rounding H are caused by dispersion in each of a quantity of incident light to a pin photo diode converting a laser beam into electric information, a gain of an I/V converting circuit, a capacity of an external capacitor, and such ringing R and waveform rounding H deteriorate the signal quality of a detection signal. Therefore, for example, because a detection signal M shows a value lower than an original value when ringing R arises, it is misunderstood that the quantity of laser beam is higher than an actual value. Accordingly, the laser beam is made too dark by controlling the quantity of laser beam to be lower than a target value by the control function of the light APC circuit 11.

In the same way, because the detection signal M shows a value higher than an original value when waveform rounding H arises, it is misunderstood that a quantity of laser beam is lower than an actual value. Accordingly, the laser beam is made too bright by controlling a quantity of laser beam to be higher than a target value by the control function of the light APC circuit 11. An optimum recording power cannot be obtained as a driving apparatus in both of the cases, which brings about a deterioration in the reliability of recording processing.

(Processing of Correction with Respect to Ringing and Waveform Rounding)

Figure 10:
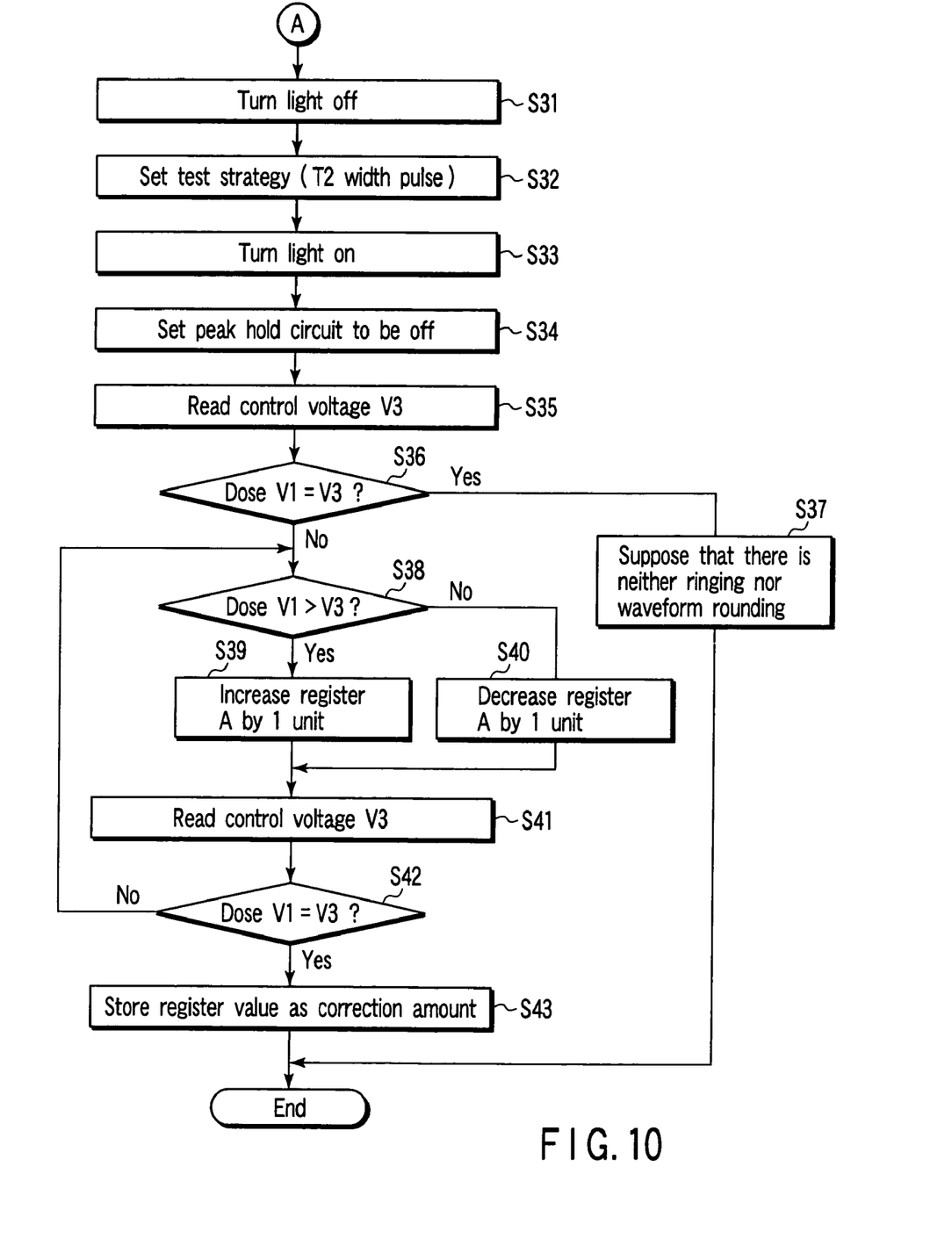
FIG. 10 is a flowchart showing one example of processing of generating a correction amount with respect to signal rounding, in the APC circuit of the optical disk apparatus according to the invention.

Next, processing of generation a correction amount with respect to such ringing and waveform rounding H will be described in detail hereinafter by using the timing charts of FIGS. 7 and 8 and the flowcharts of FIGS. 9 and 10. It is preferable that the generating of a correction amount with respect to ringing and waveform rounding H according to the invention be carried out by an engineer, for example, by using a tool, at the time of factory shipment with respect to a single optical pick-up unit, and be carried out so as to store the correction amount in the register 45 of the light APC circuit 11. Further, it is preferable that the generating of a correction amount with respect to ringing and waveform rounding H is carried out due to a test mode being set in an operating program of the system controller 10 of the optical disk apparatus, and a user or an engineer accessing the test mode. Furthermore, such an operation may be carried out at the time of starting of the optical disk apparatus without being noticed by a user by being set as one part of the operating program of the system controller 10, and is preferably automatically carried out periodically, such as, once a year.

The generating of a correction amount for eliminating the effect of ringing is carried out such that a laser beam having a pulse width which is about the laser beam used at the time of light is generated, and a control signal V1 at the time of preparing a detection signal which is not affected by ringing is determined. Next, a control signal V2 including the effect of ringing is determined by turning the peak hold circuit on, and a control amount for equalizing the both signals is determined.

In processing of determining a correction amount corresponding to ringing, in the test mode described above, and by an operation of an engineer or under the control of the system controller 10, as shown in the timing chart of FIG. 7, and in the flowchart of FIG. 9, a recording power Pw is set to the register A (S11), and respective parameters are recorded and set in the RF amplifier 16 (S12). Further, a test strategy is set to a pulse width T1 (for example, provided that a pulse width T2 usually used for recording and playback is 20 nsec, it is 1 μsec, which is about 50 times 20 nsec (S13). Then, the peak hold circuit 49 is made to be in an OFF-state (S14), the light mode is turned on (S15), and a laser beam is emitted having a pulse width T1 (s), which is long enough to make the effect of ringing negligible. At this time, the outgoing beam is Pw1 (mW), the control voltage is V1 (V), and the register value to which the outgoing beam is set is A.

By setting such a laser beam having a sufficiently long pulse width T1, it is possible to ignore a settling time until the time when ringing is settled down, and a real control voltage V1 without the effect of ringing is obtained by sampling-and-holding the portions in which ringing has not arisen (S16). Namely, the control voltage V1 corresponds to the laser control current C serving as an output of the gain amplifier 44 of FIG. 3 at the time of irradiating a laser beam having the pulse width T1. The control voltage V1 is stored in, for example, the storage region of the laser light emitting driver 20, a storage region provided by an engineer (S17).

Next, in order to determine the control voltage V2 which is affected by ringing, the peak hold circuit is turned on (S18). At this time, as shown in FIG. 7, because the monitor signal M shows E1 (V) in place of showing E2 (V) due to the effect of ringing, a control voltage (corresponding to the control current C) is varied to show the control voltage V2 (V) due to the actuation of the light APC circuit 11 (S19). As a result, the laser beam is made to be Pw2 (mW), and the laser beam is made unreasonably dark due to the effect of ringing (Pw1>Pw2).

Originally, in a state in which there is no ringing, by using the fact that E1=E2 and V1=V2, it is determined whether or not it is V1=V2 (S20). When the control voltage V1=V2, it is determined that ringing has not arisen, and the routine proceeds to processing of generating a correction amount corresponding to waveform rounding in FIG. 10. When it is not V1=V2, it is questioned whether or not it is V1>V2 (S21), and when it is V1>V2, the value of the register A which is a correction value is increased by one unit (S22), and when it is V1<V2, the value of the register A which is a correction value is decreased by one unit (S23), and a variation in the control signal V2 is investigated again (S24). This adjustment of the value of the register A is repeated until the time when it is made to be V1=V2 (S25), and the value of the register A when it is made to be finally V1=V2 is determined to be the correction amount for solving the effect of ringing (S26).

Next, processing of generating of a correction amount corresponding to waveform rounding will be described by using the flowchart of FIG. 10. In step S20, when it is V1=V2, it is determined that there is no ringing, and next, the effect of waveform rounding is investigated, and a correction amount corresponding thereto is generated.

With respect to waveform rounding, as shown in FIG. 8, the effect thereof is detected as a form of a control voltage V3 by using a pulse T2 (s) having the same length as that of the pulse used at the time of writing. Namely, in the flowchart of FIG. 10, the light mode is tuned off (S31), and a test strategy is set as a pulse width T2 (S32). Then, due to the light mode being turned on (S33), and due to the peak hold circuit 49 being turned on (S34), as shown in FIG. 8, when there is waveform rounding, an effect appears as a value of the control voltage V3. Here, the control voltage V3 is read (S35), and is compared with the control voltage V1 in the case where there is no effect of ringing or waveform rounding. When it is V1=V3 (S36), it is determined that there is neither ringing nor waveform rounding, and the correction amount is zero or the correction amount is not generated (S37).

When it is not V1=V3, it is questioned whether or not it is V1>V3 (S38), and when it is V1>V3, the value of register A which is a correction value is increased by one unit (S39), and when it is V1<V3, the value of the register A which is a correction value is decreased by one unit (S40), and a variation in the control signal V3 is investigated again (S41). This adjustment of the value of the register A is repeated until the time when it is made to be V1=V3 (S42), and the value of the register A when it is made to be finally V1=V3 is determined to be the correction amount for solving the effect of waveform rounding (S43).

The correction amount is stored in the register 45 of the light APC circuit 11 in FIG. 3 in order to reduce/eliminate the effect of ringing or waveform rounding. This operation may be automatically carried out by the system controller 10, or may be carried out by an engineer at the time of factory shipment. Then, at the time of the operation of usual recording of the optical disk apparatus, the control signal generated in order for the front monitor signal M to be close to the reference voltage VR is further corrected by the operation of the gain amplifier 44 based on the correction amount provided from the register 45, and for example, the effect of ringing or the effect of waveform rounding is reduced or eliminated. In accordance therewith, it is possible to avoid that a quantity of light of the laser beam is made inappropriate due to the effect of ringing or waveform rounding, and to provide an optical disk apparatus which carries out highly reliable recording processing.

As described above, in the method of controlling the optical disk apparatus according to the invention, in order to solve an error which included in a detection signal of a front monitor detecting a quantity of light of a laser beam, and which is generated due to ringing and waveform rounding, a laser beam having a pulse width sufficiently long which is not used in the usual operation is used with being away from a usual operation. One example of this pulse width is a laser beam having a sufficiently long pulse width in which, provided that the pulse width usually used for recording or playback is 20 nsec, a pulse width is 1 μsec which is about 50 times 20 nsec.

Namely, a laser beam is emitted by two types of a recording pulse having a sufficiently long pulse width (for example, 1 μsec) with respect to a time width of ringing and waveform rounding and a recording pulse having a short pulse width (for example, 20 nsec) with respect to the above-described time width. The peak hold circuit is turned on and off at that time, and an error amount generated due to ringing and waveform rounding is determined on the basis of a difference of the voltages controlling the outgoing laser beam.

Due to a control signal being corrected at the time of recording in accordance with the error amount determined in this way, even in a front monitor in which ringing or waveform rounding is great, due to a laser beam having an appropriate quantity of light being supplied without including these error amounts, an optical disk apparatus which can carry out stable recording processing can be provided.

Note that, in the prior art in the Patent Document 1, only a laser beam having a normal pulse width can be used because of the detection of a quantity of shift carried out at the time of usual writing operation, and therefore, errors of ringing and waveform rounding cannot be sufficiently detected.

In accordance with the various embodiments described above, those skilled in the art can realize the present invention. However, it is easy for those skilled in the art to further conceive of various modifications of these embodiments, and the present invention can be realized using various embodiments without inventive ability. Accordingly, the present invention extends over a broad range which does not contradict the disclosed principles and the novel features, and is not limited to the embodiments described above.

What is claimed is:

1. A method of controlling an optical disk apparatus, comprising:
    causing a light emitting unit to emit a test laser beam having a pulse width broader than a pulse width used at a time of recording;
    causing a light receiving unit to receive the test laser beam and to output a first detection signal;
    generating a first control signal by comparing a value held at a peak level of the first detection signal with a target value of a quantity of the test laser beam;
    generating a second control signal by comparing the first detection signal with the target value of the test quantity of the test laser beam;
    determining and storing a correction amount for equalizing the first control signal and the second control signal when the first control signal and the second control signal are not equal to each other; and
    controlling the quantity of light of a recording laser beam by correcting a recording control signal generated in accordance with a recording detection signal from the light receiving unit by means of the correction amount and by supplying the corrected control signal to a driving unit of the light emitting unit when information is recorded onto an optical disk.

2. The method of controlling an optical disk apparatus, according to claim 1, further comprising:
    causing the light emitting unit to emit a second test laser beam with a pulse width used at a time of recording when the first control signal and the second control signal are equal to each other;
    causing the light receiving unit to receive the second test laser beam at that time and to output a second detection signal;
    generating a third control signal by comparing the second detection signal with a target value of a quantity of the second test laser beam;
    determining and storing a second correction amount for equalizing the first control signal and the third control signal when the first control signal and the third control signal are not equal to each other; and
    controlling the quantity of light of the recoding laser beam by correcting the recording control signal generated in accordance with the recoding detection signal from the light receiving unit by means of the second correction amount and by supplying the corrected control signal to the driving unit of the light emitting unit when information is recorded onto an optical disk.

3. The method of controlling an optical disk apparatus, according to claim 1, wherein the pulse width which is broader than the pulse width used at a time of recording is a pulse width having a period longer than a period of ringing of the first detection signal.

4. The method of controlling an optical disk apparatus, according to claim 1, wherein determining and storing a correction amount is automatically carried out every predetermined period.

5. The method of controlling an optical disk apparatus, according to claim 1, wherein determining and storing a correction amount is carried out at a time of factory shipment of the optical disk apparatus.

6. An optical disk apparatus comprising:
    a light emitting unit which emits a laser beam;
    a light receiving unit which receives the laser beam and outputs a detection signal;
    a driving unit which causes the light emitting unit to emit the laser beam by supplying a driving signal to the light emitting unit;
    a power control unit which controls a quantity of light of the laser beam by receiving the detection signal from the light receiving unit and generating a control signal by comparing the detection signal with a target value of the laser beam, and by supplying the control signal to the driving unit; and
    a control unit which causes the light emitting unit to emit a test laser beam having a pulse width broader than a pulse width used at a time of recording; causes the light receiving unit to receive the test laser beam and to output a first detection signal; generates a first control signal by comparing a value held at a peak level of the first detection signal with a target value of a quantity of the test laser beam at the power control unit; generates a second control signal by comparing the first detection signal with a target value of a quantity of the test laser beam; determines and stores a correction amount for equalizing the first control signal and the second control signal when the first control signal and the second control signal are not equal to each other; and corrects the control signal generated in accordance with the detection signal from the light receiving unit by means of the correction amount and supplies the corrected signal to the driving unit of the light emitting unit when information is recorded onto an optical disk, thereby controlling the quantity of light of a recording laser beam.

7. The optical disk apparatus according to claim 6, wherein, by the control of the control unit,
    the light emitting unit is caused to emit a second test laser beam at the pulse width used at a time of recording when the first control signal and the second control signal are equal to each other,
    the light receiving unit is caused to receive the second test laser beam and to output a second detection signal;
    a third control signal is generated by comparing the second detection signal with the target value of a quantity of the second test laser beam at the power control unit,
    when the first control signal and the third control signal are not equal to each other, a second correction amount for equalizing the first control signal and the third control signal is determined and stored, and
    when information is recorded onto an optical disk, a quantity of light of the recording laser beam is controlled by correcting the control signal generated in accordance with the detection signal from the light receiving unit by means of the second correction amount and by supplying the corrected control signal to the driving unit of the light emitting unit.

8. The optical disk apparatus according to claim 6, wherein the pulse width which is broader than the pulse width used at a time of recording is a pulse width having a period longer than a period of ringing of the first detection signal.

9. The optical disk apparatus according to claim 6, wherein determining and storing a correction amount is automatically carried out every predetermined period by the control of the control unit.

* * * * *